US011917093B2

(12) United States Patent
Hould et al.

(10) Patent No.: US 11,917,093 B2
(45) Date of Patent: Feb. 27, 2024

(54) DOWNLEAD CABLE

(71) Applicant: Gentex Corporation, Simpson, PA (US)

(72) Inventors: Gregory Hould, Manchester, NH (US); Christopher Hudson, Bedford, NH (US)

(73) Assignee: GENTEX CORPORATION, Simpson, PA (US)

( * ) Notice: Subject to any disclaimer, the term of this patent is extended or adjusted under 35 U.S.C. 154(b) by 0 days.

(21) Appl. No.: 18/005,997

(22) PCT Filed: Jul. 29, 2021

(86) PCT No.: PCT/US2021/043732
§ 371 (c)(1),
(2) Date: Jan. 19, 2023

(87) PCT Pub. No.: WO2022/026730
PCT Pub. Date: Feb. 3, 2022

(65) Prior Publication Data
US 2023/0199100 A1 Jun. 22, 2023

Related U.S. Application Data

(60) Provisional application No. 63/059,700, filed on Jul. 31, 2020.

(51) Int. Cl.
*H04M 1/60* (2006.01)
*H04B 1/3827* (2015.01)
*H04R 1/10* (2006.01)

(52) U.S. Cl.
CPC .......... *H04M 1/6058* (2013.01); *H04B 1/385* (2013.01); *H04R 1/1033* (2013.01);
(Continued)

(58) Field of Classification Search
CPC ................ H04M 1/6058; H04B 1/385; H04B 2001/3855; H04B 2001/3872; H04R 1/1033
See application file for complete search history.

(56) References Cited

U.S. PATENT DOCUMENTS 5,287,398 A * 2/1994 Briault ................... H04M 11/04
379/102.01
6,078,675 A * 6/2000 Bowen-Nielsen ... H04R 25/554
381/370
(Continued)

FOREIGN PATENT DOCUMENTS

WO 2019/222648 A1 11/2019

OTHER PUBLICATIONS

International Search Report and Written Opinion issued in corresponding International Patent Application No. PCT/US21/43732 dated Dec. 20, 2021, 11 pages.

*Primary Examiner* — Jinsong Hu
*Assistant Examiner* — Rui M Hu
(74) *Attorney, Agent, or Firm* — Morgan, Lewis & Bockius LLP

(57) ABSTRACT

A downlead cable includes a first connector configured to connect to a headset of a communication system. A second connector is configured to connect to a connection port of a handset or a radio system. The downlead cable further includes wires connecting the first and second connectors and a cable jacket encapsulating the wires. A transformer is wired inline between the first and second connectors. The transformer is configured to enable the headset to mimic the electrical characteristics a microphone which the handset or the radio system is configured to interface.

18 Claims, 3 Drawing Sheets

(52) U.S. Cl.
CPC ............... *H04B 2001/3855* (2013.01); *H04B 2001/3872* (2013.01)

(56) References Cited

U.S. PATENT DOCUMENTS

| | | | | |
|---|---|---|---|---|
| 6,222,928 | B1* | 4/2001 | Downs, Jr. | H04R 3/00 381/114 |
| 6,266,423 | B1* | 7/2001 | Werrbach | H03G 11/04 381/108 |
| 6,408,069 | B1* | 6/2002 | Furlong | H04M 1/58 379/398 |
| 6,671,371 | B1* | 12/2003 | McNeill | H04M 1/6008 379/390.03 |
| 6,731,748 | B1* | 5/2004 | Edgar, III | H04M 1/738 379/27.01 |
| 6,970,557 | B2* | 11/2005 | Rodriguez | H04M 1/2535 379/403 |
| 7,006,625 | B2* | 2/2006 | Rodriguez | H04M 1/2535 379/403 |
| 8,170,231 | B2* | 5/2012 | Garra | H04B 1/385 381/74 |
| 9,210,508 | B1* | 12/2015 | Cloud | H04R 1/04 |
| 9,306,519 | B1* | 4/2016 | Cloud | H03F 3/68 |
| 10,374,562 | B1* | 8/2019 | Cloud | H03F 3/187 |
| 2004/0022395 | A1* | 2/2004 | Turnbull | H04M 1/05 381/74 |
| 2004/0087352 | A1* | 5/2004 | Laderman | H04B 1/3838 455/556.1 |
| 2005/0147229 | A1* | 7/2005 | King | H04M 1/6058 379/388.01 |
| 2006/0078135 | A1* | 4/2006 | Royer | H04R 9/048 381/399 |
| 2007/0025561 | A1* | 2/2007 | Gauger, Jr. | H04R 1/1025 381/384 |
| 2007/0131445 | A1* | 6/2007 | Gustavsson | H04M 1/6058 174/74 R |
| 2007/0223717 | A1* | 9/2007 | Boersma | H04R 1/1041 381/74 |
| 2008/0004089 | A1* | 1/2008 | Huizer | H04M 1/6058 455/575.2 |
| 2008/0159577 | A1* | 7/2008 | Smith | H04M 1/05 381/361 |
| 2008/0167092 | A1* | 7/2008 | Ueda | H04M 1/6066 455/575.2 |
| 2009/0179768 | A1* | 7/2009 | Sander | H04M 1/6058 340/13.27 |
| 2009/0209217 | A1* | 8/2009 | Coersmeier | H04B 1/3805 455/142 |
| 2010/0104092 | A1* | 4/2010 | Cusinato | H04M 1/6058 379/428.02 |
| 2011/0135118 | A1* | 6/2011 | Osborne | H04R 5/02 381/122 |
| 2011/0228954 | A1* | 9/2011 | Saulespurens | H04R 3/00 381/113 |
| 2011/0261980 | A1* | 10/2011 | Akino | H04R 9/048 381/176 |
| 2012/0238237 | A1* | 9/2012 | Crestol | H04W 4/10 455/41.3 |
| 2013/0187794 | A1* | 7/2013 | Sherwood | H04R 1/1091 340/945 |
| 2013/0281034 | A1* | 10/2013 | Mazzeo | H04M 1/0214 455/90.2 |
| 2014/0079236 | A1* | 3/2014 | Yamkovoy | H04R 3/00 381/71.6 |
| 2015/0270892 | A1* | 9/2015 | De Las Heras Iglesias | H04R 1/08 455/3.05 |
| 2016/0165021 | A1 | 6/2016 | Broadley et al. | |
| 2016/0183067 | A1 | 6/2016 | Auranen et al. | |
| 2016/0212537 | A1* | 7/2016 | Hernandez | H04R 3/12 |
| 2016/0234597 | A1* | 8/2016 | Akino | H04R 3/007 |
| 2016/0244006 | A1* | 8/2016 | Challancin | H02J 1/082 |
| 2016/0302029 | A1* | 10/2016 | Broadley | H04M 1/6058 |
| 2018/0084325 | A1* | 3/2018 | Goeke | H04R 3/00 |
| 2018/0219334 | A1* | 8/2018 | Kahlman | G06F 13/4063 |
| 2021/0084413 | A1* | 3/2021 | Skjoldborg | H04R 1/1041 |
| 2021/0195336 | A1* | 6/2021 | Yaroslavski | H04R 5/033 |

* cited by examiner

DOWNLEAD CABLE

CROSS REFERENCE TO RELATED APPLICATIONS

This application is a 371 of International Patent Application No. PCT/US2021/043732 filed on Jul. 29, 2021, which claims priority to U.S. Provisional Application No. 63/059,700 filed on, Jul. 31, 2020, the entirety of each is incorporated herein by reference for all purposes.

BACKGROUND

Communication headsets are typically tailored for use with specific intercom or radio systems. As a result, different headsets may expect microphones with different impedance and/or sensitivity levels. Consequently, typical communication headsets may not work interchangeably with different intercom or radio systems.

BRIEF SUMMARY OF THE INVENTION

A downlead cable may include: a first connector configured to connect to a headset of a communication system; a second connector configured to connect to a connection port of a handset or a radio system; at least one wire connecting the first and second connectors; a cable jacket encapsulating the wires; and a transformer wired inline between the first and second connectors. The transformer is configured to enable the headset to mimic the electrical characteristics a microphone which the handset or the radio system is configured to interface.

A downlead cable may include: a first connector configured to connect to a headset of a communication system; a second connector configured to connect to a connection port of a handset or a radio system; at least one wire connecting the first and second connectors; a cable jacket encapsulating the wires; and a transformer overmolded on the downlead cable between the first and second connectors. The transformer is configured to enable the headset to mimic the electrical characteristics a microphone which the handset or the radio system is configured to interface, transformer being disposed proximal to the first connector relative to the second connector.

A communication system may include a headset comprising at least one audio output earcup, a controller, and a microphone; a radio system operably connected to the headset; a handset configured to toggle the radio between a transmission mode and a reception mode; and a downlead cable connecting the headset to the handset or the radio system. The downlead cable includes a transformer configured to enable the headset to mimic the electrical characteristics a microphone which the handset or the radio system is configured to interface.

Additional features and advantages of the subject technology will be set forth in the description below, and in part will be apparent from the description, or may be learned by practice of the subject technology. The advantages of the subject technology will be realized and attained by the structure particularly pointed out in the written description and claims hereof as well as the appended drawings.

It is to be understood that both the foregoing general description and the following detailed description are exemplary and explanatory and are intended to provide further explanation of the subject technology as claimed.

BRIEF DESCRIPTION OF THE DRAWINGS

The following detailed description of embodiments of the communication headset will be better understood when read in conjunction with the appended drawings of an exemplary embodiment. It should be understood, however, that the invention is not limited to the precise arrangements and instrumentalities shown.

DETAILED DESCRIPTION

Figure 1:
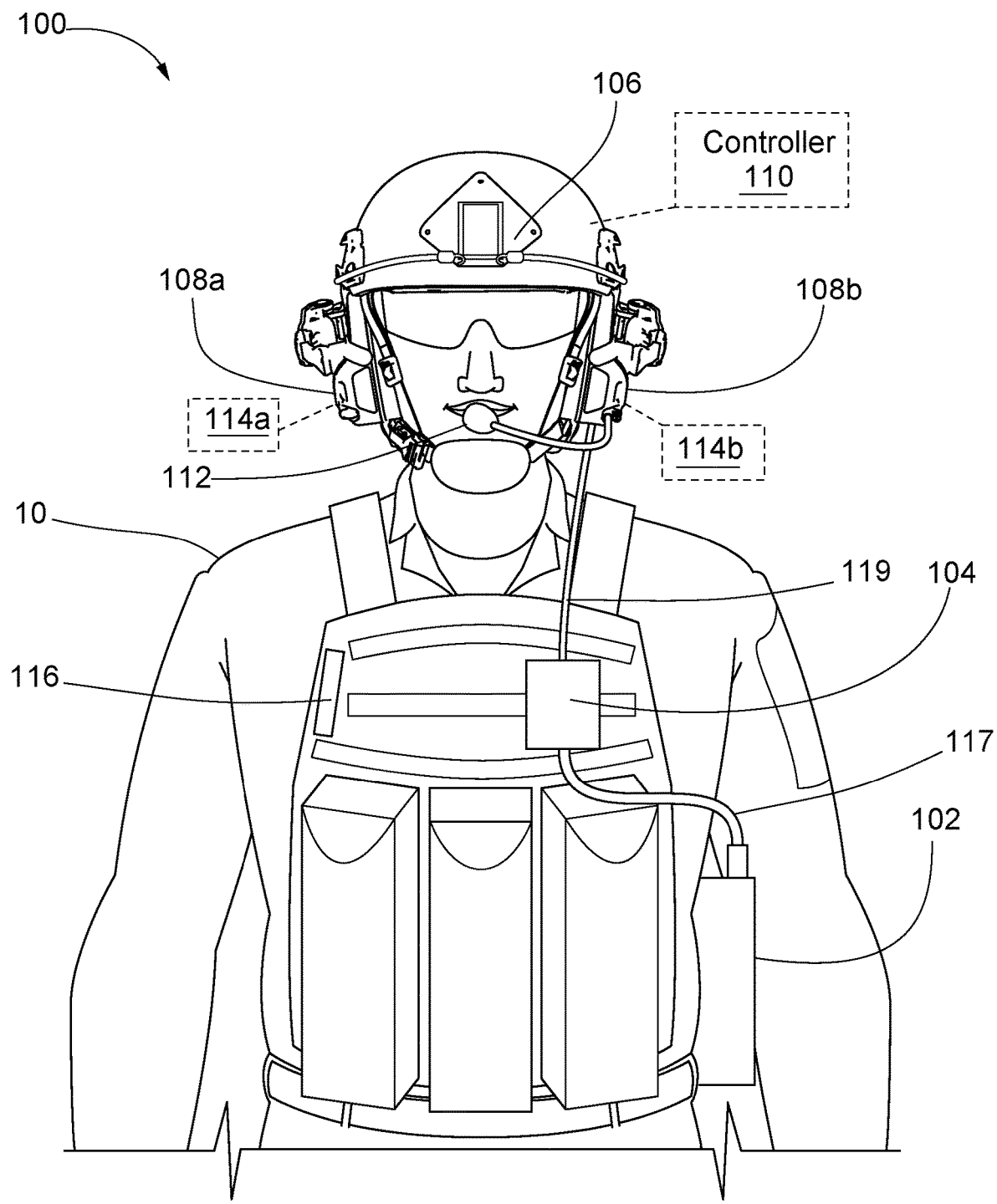
FIG. 1 is a schematic representation of a communication system for a user according to at least one embodiment of the present disclosure.
Figure 2:
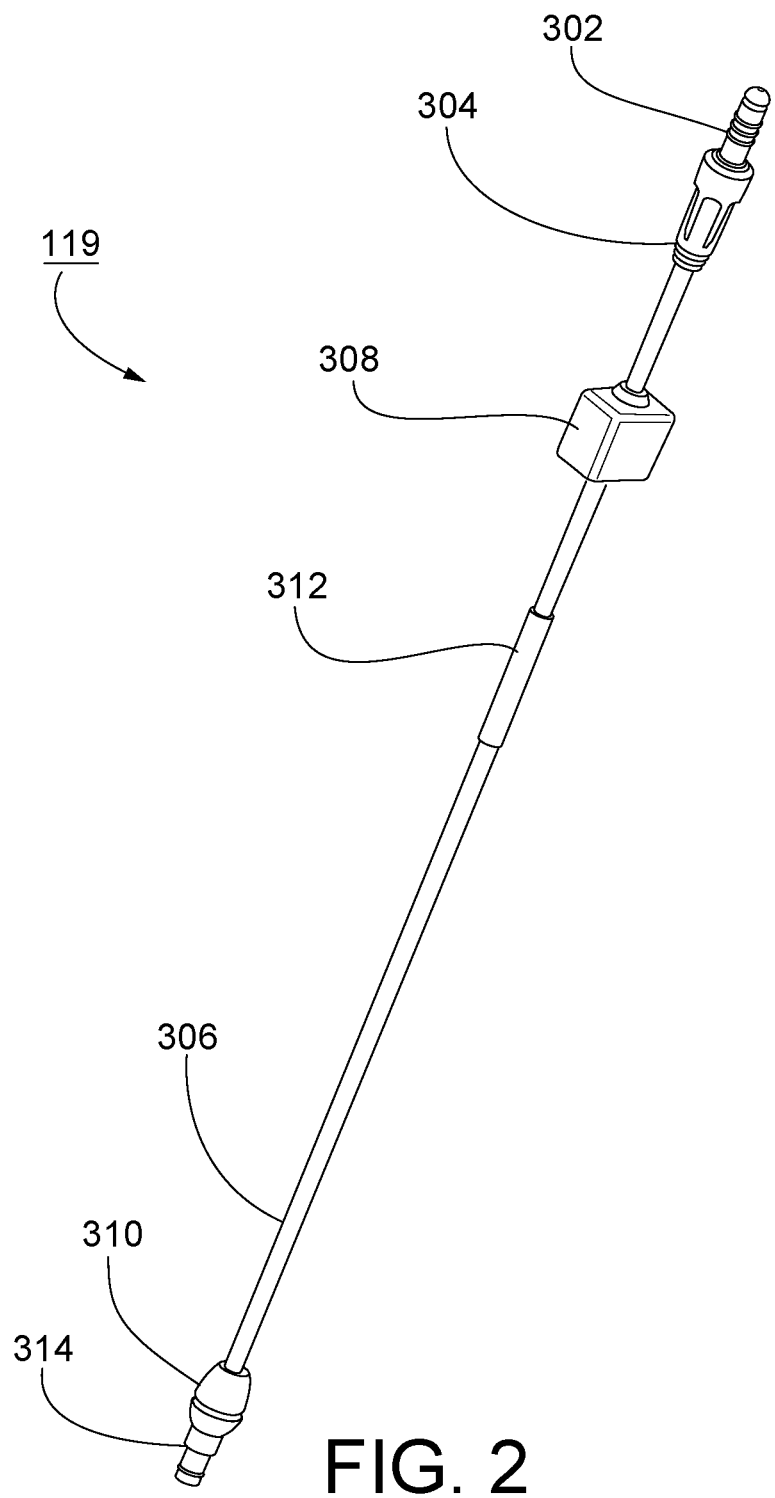
FIG. 2 is a perspective view of a downlead cable according to at least one embodiment of the present disclosure.
Figure 3:
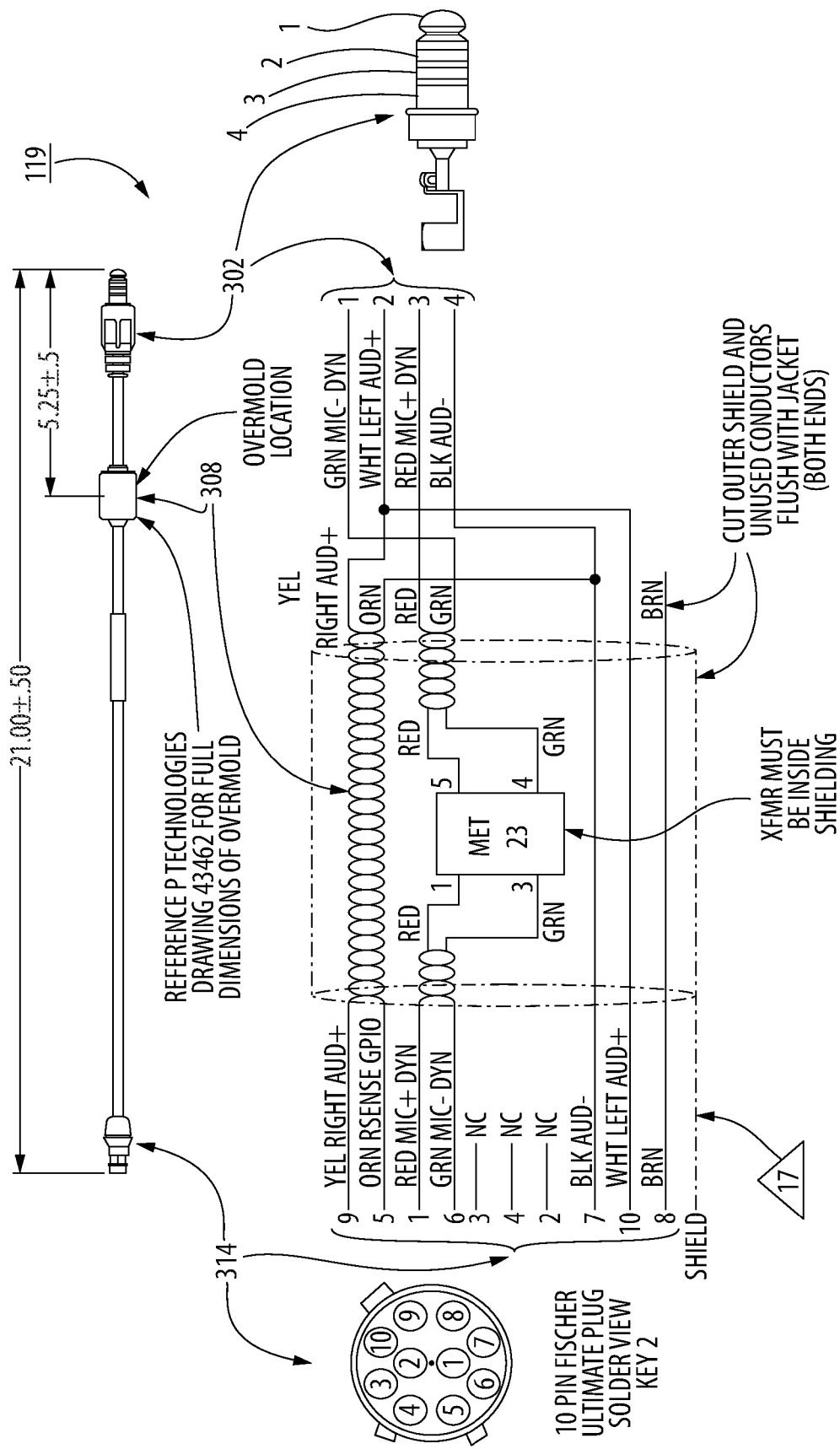
FIG. 3 is a schematic drawing showing various connections points of a downlead cable, according to at least one embodiment of the present disclosure.

Referring to the drawings in detail, wherein like reference numerals indicate like elements throughout, there is shown in FIGS. 1-3 a communication system 100 for a user 10, generally designated, in accordance with an embodiment of the present disclosure.

Referring to FIG. 1, the communication system 100 may include at least one of: a radio 102, a push-to-talk (PTT) handset 104, a headset 106 which may include right and left earcups 108a-108b, a controller 110, a microphone 112, and right and left ambient sound microphones 114a-114b.

The radio 102 may be configured to transmit and/or receive radio signals using an antenna. In some embodiments, the radio 102 may be a plurality of radios, each configured to receive a separate and distinct radio signal. The radio 102 may be configured to demodulate and/or decode the radio signals and provide an audio signal representative of the radio signals that can be used by the headset 106 and earcups 108a-b to drive a speaker configured to produce sounds audible to the user 10. In addition, the radio 102 may be configured to receive audio signals from the microphone 112, encode and/or modulate the audio signals, and transmit radio signals representative of the audio signal to external sources (e.g., another radio).

The handset 104 may be configured to toggle the radio 102 between transmission and reception of the radio signals. Handset 104 may be connected to radio 102 through cable 117 and may be connected to headset 106 via cable 119. The radio 102 may be toggled by the user via the handset 104. For example, the handset 104 may include a pushbutton (not shown). If the pushbutton is activated by the user, the handset 104 toggles the radio 102 to operate in a transmission mode. In the transmission mode, the handset 104 may toggle the radio 102 to transmit an audio signal received from the microphone 112. If the pushbutton is not activated by the user, the handset 104 may toggle the radio 102 to operate in a reception mode. In the reception mode, the handset 104 may receive an audio signal from an external source terminal and deliver it to the left and right earcups 108a-108b.

The handset 104 may be configured to transmit and receive audio signals over multiple radio channels. As used herein, the term "channel" may refer to a band of frequencies that correspond to a radio signal. The handset 104 may include a plurality of radio channel ports, each configured to receive a radio channel from one or more radios. One or more pushbuttons may be assigned to one or more radio channel ports to toggle the radios between transmission and reception of radio signals.

The handset 104 may be couplable to an accessory or clothing. In one embodiment, the handset 104 is removably coupled to a strap extending across a user's chest such that the handset is quickly accessible by at least one hand. In one embodiment, the handset is configured to couple to webbing 116. Webbing 116 may be modular lightweight load-carrying equipment (e.g., MOLLE) webbing or pouch attachment ladder system (PALS) webbing, among others. In some embodiments, the webbing 116 is comprised of heavy-duty nylon. The webbing 116 may be stitched onto a vest of the user 10 to allow for the attachment of various compatible pouches and accessories. In some embodiments, the webbing 116 may include one or more horizontal rows of, for example, approximately 1 inch (2.5 cm) webbing. Each of the horizontal rows of the webbing 116 may be spaced 1 inch apart. The webbing 116 may be attached to a backing at 1.5 inch (3.8 cm) intervals.

Microphone 112 may be configured to convert sound produced by the user into an electrical audio signal. The electrical audio signal from the microphone 112 may be transmitted to the radio 102 for wireless broadcasting.

The controller 110 may be configured to improve communication functionality for this user. In some embodiments, the controller 110 is a microprocessor having memory. The memory may include one or more programs that when executed by a processor, cause the processor to perform one or more functions described herein. In some embodiments, the controller may include passive electrical components that are configured to process audio signals.

The handset 104 may include one or more channels. In some embodiments, the handset 104 may include one, two, three or four channels. Each of the one or more channels may be a separate and distinct audio signal received from one or more radios, such as radio 102 in FIG. 1. In some embodiments, the one or more radios may be dual-channel. As used herein, the term "dual-channel" may refer to a radio that provides two or more distinct audio signals.

The handset 104 may include a first remote PTT connector and a second remote PTT connector configured to connect to one or more remote PTTs. The remote PTT may be a pushbutton connected to a wire that allows a user 10 to place the pushbutton at a different position on the body of the user 10 and activate the handset 104 using the pushbutton. One or more of the remote PTT connectors may be a 2.5 mm jack. One or more of the remote PTT connectors may include a waterproof seal. One or more of the remote PTT connectors may be epoxy potted during assembly of the handset 104 to make the at least one of the remote PTT connectors waterproof. The handset 104 has been described in detail in International Application Number: PCT/2019/032900 which was published as WO 2019/222648, which has been incorporated herein by reference in its entirety for all purposes.

Referring now to FIG. 2, the downlead cable 119 includes a first connector 302 interfacing with the handset 104 and a second connector 314 interfacing with the headset 106. The downlead cable 119 further includes a cable jacket 306 to secure the various wires connecting the headset 106 to the handset 104. Alternatively, the first connector 302 of the downlead cable 119 may interface directly with the radio 102 in some embodiments.

In some embodiments, an identifier tag 312 may be included on the cable jacket 306. The identifier tag may facilitate identification of the cable and may include additional information such as, for example, information relating compatibility with various systems, information relating to materials and electrical characteristics, and/or information relating to dimensions of the cable.

In some embodiments, the downlead cable 119 may also include flexible connections 304 and 310 between the first connector 302 and the cable jacket 306, and the second connector 314 and the cable jacket 306 respectively. In some embodiments, the first connector 302 may be a U174 connector, an Amphenol Terrapin connector, a Nexus AP136 type connector, an ODU/LEMO type connector, or any other compatible connector. In some embodiments, the second connector 314 is may be a Fischer connector or any other compatible connector. Those of ordinary skill in the art will recognize the various compatible connectors that may be used to replace those listed herein, and thus, the compatible connectors provided herein are not limited to those listed herein.

In some embodiments, the length of the downlead cable 119 may be in a range from about 15 inches to about 30 inches. For example, the length, in some embodiments, may be about 16, 17, 18, 19, 20, 21, 22, 23, 24, 25, 26, 27, 28, 29 or 30 inches, or any length between any two of these values. In some embodiments, the diameter of the downlead cable 119 may be in a range from about 0.075 inches to about 0.5 inches.

As discussed herein, different headsets 106 may be specifically tailored to particular radio or intercom systems. Consequently, when communicating with a particular headset, the radio/intercom system may expect microphones with certain impedance values and/or certain sensitivity levels. Thus, an audio signals between the headset 106 and the radio/intercom systems for a certain type of headset 106 are generated based on the expected microphone impedance and sensitivity.

However, for ease of manufacturing as well as training of personnel, there is a need for an universal headset that is compatible with different radio/intercom systems. Because downlead cables connecting the headset with the handset or the radio/intercom system are removable, one way to accomplish such cross-compatibility is to provide different downlead cables that can appropriately match the impedances between the headset and the handset and/or the radio/intercom system. However, there is potential for confusion with cables and a wrong cable attachment can result in failure of communication.

Thus, in some embodiments, a downlead cable 119 may include a transformer 308 integrated within the cable. In some embodiments, the transformer 308 allows a headset having, e.g., a 150 ohm dynamic microphone, to mimic the impedance and sensitivity of, e.g., a 5 ohm microphone.

In some embodiments the transformer 308 may be a miniature encapsulated transformer such as, for example, a Tamura MET-23 transformer. It will be appreciated that while the MET-23 transformer is provided as an example, any other suitable transformer that provides a similar functionality may be used, and thus, the possible transformers that may be used are not limited to the MET-23 transformer so long as the transformer meets the design requirements of downlead cable and provides a given headset an ability to mimic impedance and sensitivity of a different headset system.

For example, in an embodiment, the transformer 308 may have a power rating in a range from about 50 mW to about 80 mW (e.g., about 52 mW, about 54 mW, about 58 mW, about 61 mW, about 64 mW, about 65 mW, about 69 mW, about 72 mW, about 75 mW, about 80 mW, or any value between any two of these values) at 300 Hz, a turn ratio in a range from about 20:1 to about 25:1 (e.g., about 21:1, about 21.2:1, about 21.4:1, about 21.6:1, about 21.8:1, about 22:1, about 22.2:1, about 22.4:1, about 22.6:1, about 22.8:1, about 23:1, about 23.4:1, about 23.8:1, about 24:1, about 24.5:1, or any ratio between any two of these values), primary source impedance in a range from about 1.4 kΩCT to about 1.8 kΩCT (e.g., about 1.45 kΩCT, about 1.5 kΩCT, about 1.55 kΩCT, about 1.6 kΩCT, about 1.65 kΩCT, about 1.7 kΩCT, about 1.75 kΩCT, about 1.8 kΩCT, or any value between any two of these values) and a secondary load impedance in a range from about 2.8Ω to about 3.6Ω (e.g., about 2.8Ω, about 3.0Ω, about 3.2Ω, about 3.4Ω, about 3.6Ω, or any value between any two of these values), a frequency response relative to 1 kHz of in a range from about ±2 dB to about ±4 dB (e.g., about ±2.2 dB, about ±2.4 dB, about ±2.6 dB, about ±2.8 dB, about ±3 dB, about ±3.2 dB, about ±3.4 dB, about ±3.6 dB, about ±3.8 dB, about ±4.0 dB, or any other value between any two of these values), a primary coil DC resistance in a range from about 200Ω to about 250Ω (e.g., about 210Ω, about 220Ω, about 230Ω, about 240Ω, about 250Ω, or any value between any two of these values), and a secondary coil DC resistance of about 0.7Ω to about 1.3Ω (e.g., about 0.75Ω, about 0.8Ω, about 0.85Ω, about 0.9Ω, about 0.95Ω, about 1.0Ω, about 1.05Ω, about 1.1Ω, about 1.15Ω, about 1.2Ω, about 1.25Ω, about 1.3Ω, or any value between any two of these values). The transformer 308 may have an operating temperature in a range from about −30° C. to about +100° C. (or any range within this range) in some embodiments.

Advantageously, the matching of impedances using such a transformer enables a single type of headset to exchange audio signals with different types of radio/intercom systems.

In some embodiments, the transformer 308 may be wired inline into the downlead cable 119. In some embodiments, the transformer 308 may be overmolded or otherwise encapsulated over the downlead cable 119.

In some embodiments, the transformer 308 is positioned proximal to the first connector 302. In some embodiments, the transformer 308 is positioned at a distance in a range from about 2 inches to about 9 inches from the first connector 302. For example, the transformer 308 may be positioned at about 2, about 3, about 4, about 5, about 6, about 7, about 8 or about 9 or any distance between any two of these values from the first connector 302. The distance between the position of the transformer 308 and the first connector 302 may, in some embodiments, be dependent on the total length of the downlead cable 119.

The size of the overmold in which the transformer is provided is not limited, and is constrained only by the usability and design constraints of the cable.

FIG. 4 shows a wiring diagram of the various connection points for the downlead cable 119. As shown in FIG. 4, in some embodiments, the second connector 314 may have 10 pins (314-1 through 314-10) each connected to a specific component of the radio/intercom 102 or the handset 104. Similarly, the first connector 302 may have 4 pins (302-1 through 302-4), each connected to a specific component of the headset 106. Further, each of the pins may be color coded in some embodiments for ease of identification and troubleshooting. One example of the arrangement of pins in the first connector 302 and the second connector 314 is shown in the pin diagrams illustrated in FIG. 4.

In various embodiments, the materials used for manufacturing the downlead cable 119 may be compliant with the European Union directive covering the registration, evaluation, authorization and restriction of chemicals list of substances of very high concern. In other words, any substances identified on the list may not be present in the product above the applicable threshold. In some embodiments, the products, materials or components may be compliant with the European Union directive covering the restriction of hazardous substances (RoHS).

In some embodiments, the materials/products/components used in the manufacturing the downlead cable 119 may be operable in a temperature range from about −40° C. to about +71° C. In some embodiments, the assembly may meet the following requirements:

(a) Flex life: the cable may have a flex life of a minimum of 20,000 cycles when tested using a flex angle of 90 around a 1-inch diameter mandrel at a rate of 50 cycles per minute with a 0.5 lb axial load.

(b) Water immersion (mil-std-810g, change 1, method 512.6, procedure i): assembly may be sealed to withstand 1 meter immersion in salt water for 1 hour, and 3 meters immersion in salt water for 30 seconds, mated or capped. The assembly may meet all electrical requirements post-immersion.

(c) Cable assembly may withstand a 15 lb. axial pull without damage to the cable or anchoring features (connectors, junction points). This can be verified by applying a static load of 15 lb. for one minute and performing functional and visual inspections.

In some embodiments, the cable jacket 306 may be captured within the connector nut when connected to the respective connector.

In embodiments where the transformer 308 is over molded, the overmold material may be comprised of polyurethane. In some embodiments, the overmold material is flame retardant, has a flammability rating of ul 94 v-0, and/or has a 80-90 Shore A durometer.

In at least one embodiment, there is included one or more computers having one or more processors and memory (e.g., one or more nonvolatile storage devices). In some embodiments, memory or computer readable storage medium of memory stores programs, modules and data structures, or a subset thereof for a processor to control and run the various systems and methods disclosed herein. In one embodiment, a non-transitory computer readable storage medium having stored thereon computer-executable instructions which, when executed by a processor, perform one or more of the methods disclosed herein.

Illustration of Subject Technology as Clauses

Various examples of aspects of the disclosure are described as numbered clauses (1, 2, 3, etc.) for convenience. These are provided as examples, and do not limit the subject technology. Identifications of the figures and reference numbers are provided below merely as examples and for illustrative purposes, and the clauses are not limited by those identifications.

Clause 1. A downlead cable may include: a first connector configured to connect to a headset of a communication system; a second connector configured to connect to a connection port of a handset or a radio system; at least one wire connecting the first and second connectors; a cable jacket encapsulating the wires; and a transformer wired inline between the first and second connectors. The transformer is configured to enable the headset to mimic the electrical characteristics a microphone which the handset or the radio system is configured to interface.

Clause 2. The downlead cable of clause 1, wherein the first connector is selected from a group consisting of a U174 connector, an Amphenol Terrapin connector, a Nexus AP136 type connector, and an ODU/LEMO type connector.

Clause 3. The downlead cable of any of the preceding clauses, wherein the second connector is a Fischer connector.

Clause 4. The downlead cable of any of the preceding clauses, wherein the transformer has a turn ratio in a range from 20:1 to 25:1.

Clause 5. The downlead cable of any of the preceding clauses, wherein the transformer has a power rating in a range from 50 mW to 80 mW at 300 Hz.

Clause 6. The downlead cable of any of the preceding clauses, wherein the transformer has a primary source impedance in a range from 1.4 kΩCT to 1.8 kΩCT.

Clause 7. The downlead cable of any of the preceding clauses, wherein the transformer has a secondary load impedance in a range from 2.8Ω to 3.6Ω.

Clause 8. The downlead cable of any of the preceding clauses, wherein the transformer has a frequency response relative to 1 kHz in a range from ±2 dB to ±4 dB.

Clause 9. The downlead cable of any of the preceding clauses, wherein the transformer has a primary coil DC resistance in a range from 200Ω to 250Ω.

Clause 10. The downlead cable of any of the preceding clauses, wherein the transformer has a secondary coil DC resistance in a range from 0.7Ω to 1.3Ω.

Clause 11. The downlead cable of any of the preceding clauses, wherein the transformer is disposed proximal to the first connector relative to the second connector.

Clause 12. The downlead cable of any of the preceding clauses, wherein the cable has a length in a range from 15 inches to 30 inches.

Clause 13. A downlead cable may include: a first connector configured to connect to a headset of a communication system; a second connector configured to connect to a connection port of a handset or a radio system; at least one wire connecting the first and second connectors; a cable jacket encapsulating the wires; and a transformer overmolded on the downlead cable between the first and second connectors. The transformer is configured to enable the headset to mimic the electrical characteristics a microphone which the handset or the radio system is configured to interface, transformer being disposed proximal to the first connector relative to the second connector.

Clause 14. The downlead cable of clause 13, wherein the first connector has 10 pins and the second connector has 4 pins.

Clause 15. The downlead cable of any of clauses 13-14, wherein the transformer has a turn ratio in a range from 20:1 to 25:1.

Clause 16. The downlead cable of any of clauses 13-15, wherein the transformer has a primary source impedance in a range from 1.4 kΩCT to 1.8 kΩCT, and a secondary load impedance in a range from 2.8Ω to 3.6Ω.

Clause 17. The downlead cable of any of clauses 13-16, wherein the transformer has a primary coil DC resistance in a range from 200Ω to 250Ω, and a secondary coil DC resistance in a range from 0.7Ω to 1.3Ω.

Clause 18. The downlead cable of any of clauses 13-17, wherein the transformer has a frequency response relative to 1 kHz in a range from ±2 dB to ±4 dB.

Clause 19. A communication system may include a headset comprising at least one audio output earcup, a controller, and a microphone; a radio system operably connected to the headset; a handset configured to toggle the radio between a transmission mode and a reception mode; and a downlead cable connecting the headset to the handset or the radio system. The downlead cable includes a transformer configured to enable the headset to mimic the electrical characteristics a microphone which the handset or the radio system is configured to interface.

Clause 20. The communication system of clause 19, wherein the microphone of the headset has an impedance of 150Ω, and the handset or the radio system are configured to interface a microphone having an impedance of 5Ω.

It will be appreciated by those skilled in the art that changes could be made to the exemplary embodiments shown and described above without departing from the broad inventive concept thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention, different components as opposed to those specifically mentioned may perform at least some of the features described herein, and features of the disclosed embodiments may be combined. As used herein, the term "about" may refer to + or −10% of the value referenced. For example, "about 9" is understood to encompass 8.1 and 9.9.

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

It will be understood that, although the terms "first," "second," etc. are sometimes used herein to describe various elements, these elements should not be limited by these terms. These terms are only used to distinguish one element from another. For example, a first element could be termed a second element, and, similarly, a second element could be termed a first element, without changing the meaning of the description, so long as all occurrences of the "first element" are renamed consistently and all occurrences of the second element are renamed consistently. The first element and the second element are both elements, but they are not the same element.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, operations, elements, and/or components, but do not preclude the presence or addition of one or more other features, integers, operations, elements, components, and/or groups thereof.

The claims directed to the method of the present invention should not be limited to the performance of their steps in the order written, and one skilled in the art can readily appreciate that the steps may be varied and still remain within the spirit and scope of the present invention.

What is claimed is:

1. A downlead cable, comprising:
   a first connector configured to connect to a headset of a communication system;
   a second connector configured to connect to a connection port of a handset or a radio system;
   at least one wire connecting the first and second connectors;
   a cable jacket encapsulating the wires; and
   a transformer wired inline between the first and second connectors, the transformer configured to enable the headset to mimic electrical characteristics of a microphone which the handset or the radio system is configured to interface,
   wherein the transformer has a turn ratio in a range from 20:1 to 25:1.

2. The downlead cable of claim 1, wherein the first connector is selected from a group consisting of a U174 connector, an Amphenol Terrapin connector, a Nexus AP136 type connector, and an ODU/LEMO type connector.

3. The downlead cable of claim 1, wherein the second connector is a Fischer connector.

4. The downlead cable of claim 1, wherein the transformer has a power rating in a range from 50 mW to 80 mW at 300 Hz.

5. The downlead cable of claim 1, wherein the transformer has a primary source impedance in a range from 1.4 kΩCT to 1.8 kΩCT.

6. The downlead cable of claim 1, wherein the transformer has a secondary load impedance in a range from 2.8Ω to 3.6Ω.

7. The downlead cable of claim 1, wherein the transformer has a frequency response relative to 1 kHz in a range from ±2 dB to ±4 dB.

8. The downlead cable of claim 1, wherein the transformer has a primary coil DC resistance in a range from 200Ω to 250Ω.

9. The downlead cable of claim 1, wherein the transformer has a secondary coil DC resistance in a range from 0.7Ω to 1.3Ω.

10. The downlead cable of claim 1, wherein the transformer is disposed proximal to the first connector relative to the second connector.

11. The downlead cable of claim 1, wherein the downlead cable has a length in a range from 15 inches to 30 inches.

12. A downlead cable, comprising:
    a first connector configured to connect to a headset of a communication system;
    a second connector configured to connect to a connection port of a handset or a radio system;
    at least one wire connecting the first and second connectors;
    a cable jacket encapsulating the wires; and
    a transformer overmolded on the downlead cable between the first and second connectors, the transformer configured to enable the headset to mimic electrical characteristics of a microphone which the handset or the radio system is configured to interface, the transformer being disposed proximal to the first connector relative to the second connector,
    wherein the transformer has a turn ratio in a range from 20:1 to 25:1.

13. The downlead cable of claim 12, wherein the first connector has 10 pins and the second connector has 4 pins.

14. The downlead cable of claim 12, wherein the transformer has a primary source impedance in a range from 1.4 kΩCT to 1.8 kΩCT, and a secondary load impedance in a range from 2.8Ω to 3.6Ω.

15. The downlead cable of claim 12, wherein the transformer has a primary coil DC resistance in a range from 200Ω to 250Ω, and a secondary coil DC resistance in a range from 0.7Ω to 1.3Ω.

16. The downlead cable of claim 12, wherein the transformer has a frequency response relative to 1 kHz in a range from ±2 dB to ±4 dB.

17. A communication system comprising:
    a headset comprising at least one audio output earcup, a controller, and a microphone;
    a radio system operably connected to the headset;
    a handset configured to toggle the radio system between a transmission mode and a reception mode; and
    a downlead cable connecting the headset to the handset or the radio system, the downlead cable comprising a transformer configured to enable the headset to mimic electrical characteristics of a microphone which the handset or the radio system is configured to interface,
    wherein the transformer has a turn ratio in a range from 20:1 to 25:1.

18. The communication system of claim 17, wherein the microphone of the headset has an impedance of 150Ω, and the handset or the radio system are configured to interface a microphone having an impedance of 5Ω.

* * * * *